(12) United States Patent
Itagaki et al.

(10) Patent No.: US 8,089,232 B2
(45) Date of Patent: Jan. 3, 2012

(54) MOTOR DRIVE DEVICE AND SEMICONDUCTOR INTEGRATED CIRCUIT DEVICE

(75) Inventors: Kichiya Itagaki, Tokyo (JP); Minoru Kurosawa, Tokyo (JP)

(73) Assignee: Renesas Electronics Corporation, Kanagawa (JP)

( * ) Notice: Subject to any disclaimer, the term of this patent is extended or adjusted under 35 U.S.C. 154(b) by 387 days.

(21) Appl. No.: 12/277,729

(22) Filed: Nov. 25, 2008

(65) Prior Publication Data

US 2009/0189556 A1 Jul. 30, 2009

(30) Foreign Application Priority Data

Jan. 25, 2008 (JP) ................................ 2008-014415

(51) Int. Cl.
*H02P 6/04* (2006.01)

(52) U.S. Cl. .......... 318/400.11; 318/400.02; 318/400.09

(58) Field of Classification Search ............. 318/400.11, 318/400.02, 400.09, 801, 778, 716, 437, 318/599, 433, 434, 432
See application file for complete search history.

(56) References Cited

U.S. PATENT DOCUMENTS

| | | | |
|---|---|---|---|
| 4,860,186 A * | 8/1989 | Maekawa et al. | 363/41 |
| 6,998,801 B2 | 2/2006 | Kurosawa et al. | |
| 2005/0046369 A1 * | 3/2005 | Kobayashi et al. | 318/432 |
| 2006/0049792 A1 * | 3/2006 | Chen et al. | 318/716 |
| 2007/0064454 A1 * | 3/2007 | Chen et al. | 363/49 |

FOREIGN PATENT DOCUMENTS

JP 2005-278386 10/2005
* cited by examiner

*Primary Examiner* — Karen Masih
(74) *Attorney, Agent, or Firm* — Mattingly & Malur, PC

(57) ABSTRACT

The disclosed invention achieves a significant reduction in the noise and vibration of a brushless motor from a startup up to the number of steady revolutions. To drive the brushless motor from stop up to the number of steady revolutions, when the arithmetic sequencer detects a rise of a clock signal CARYCLK, current control arithmetic is executed. On detecting a fall of the clock signal, the arithmetic sequence determines whether a division control signal DIVCNT has changed. If this signal has changed, soft switch arithmetic is executed. When the division control signal has not changed or after the completion of soft switching arithmetic, the arithmetic sequencer determines whether a rise of a mask signal MASK has occurred during one cycle of the PWM carrier signal CARYCLK. If a rise of the mask signal has not occurred, the operation returns to the first step. If a rise of the mask signal has occurred, PLL control arithmetic is executed, then the operation returns to the first step.

10 Claims, 10 Drawing Sheets

MOTOR DRIVE DEVICE AND SEMICONDUCTOR INTEGRATED CIRCUIT DEVICE

CROSS-REFERENCE TO RELATED APPLICATIONS

The disclosure of Japanese Patent Application No. 2008-14415 filed on Jan. 25, 2008 including the specification, drawings and abstract is incorporated herein by reference in its entirety.

BACKGROUND OF THE INVENTION

The present invention relates to a motor drive control technique and, particularly, to a technique that is effective for control of revolution of a multi-phase brushless motor for use in a hard disk drive (HDD) or the like.

A spindle motor is widely used to drive a magnetic disk in a hard disk system or the like. The spindle motor comprises a brushless DC multi-phase motor and the spindle motor is driven by, for example, an IC dedicated to driving the motor (motor drive IC) and spins the magnetic disk at a high speed.

As a method for driving the spindle motor by this type of motor drive IC, a soft switching method is widely known in which PWM (Pulse Width Modulation) is performed for two phases during current-conducting phase switching to suppress a steep change in current.

In order to spin the spindle motor, it is essential to detect the position of the motor. As a sensor-less method, a technique is known that detects the back electromotive force (BEMF) of the motor during a non-conducting period following the above current-conducting phase switching.

The motor drive IC that performs such soft switching control includes an output section which is comprised of, for example, a plurality of power MOS (Metal Oxide Semiconductor) transistors and a predriver and drives a spindle motor, a DC current detecting section which detects a motor drive current, a BEMF detecting section which detects the back electromotive force of the spindle motor, an A/D (Analog/Digital) converter which converts a voltage appearing in a DC current or a non-conducting phase out of three phases into a digital value, and a logic section.

The logic section includes a PLL (Phase Locked Loop) control loop, a current control loop, a soft switching controller which suppresses a steep change in current, a serial port which receives a command from an MPU (Micro Processing Unit), resisters, and others.

For this type of soft switching control, for example, a method that controls the switching time and dead time according to the characteristics of the power MOS transistors is known (refer to Patent Document 1).
[Patent Document 1]
Japanese Unexamined Patent Publication No. 2005-278386

SUMMARY OF THE INVENTION

It has been found by the present inventors that the technique for driving the spindle motor by the above-described motor drive IC encounters the following problems.

In this type of motor drive IC, when running the motor at a steady speed, instead of 120 deg conduction, the above-mentioned soft switching drive method with a minimized non-conducting phase or sine (sin) wave driving without a non-conducting phase (180 deg conduction) is performed, thereby reducing noise.

However, when starting up the hard disk system, the spindle motor is driven by 120 deg conduction for which there is no need for generating a voltage profile with asynchronous PWM. This gives rise to a problem of a high noise level during a startup.

It is possible to perform soft switching control during a startup, but in that case, a voltage profile has to be synchronous with the number of revolutions and consequently the PWM frequency becomes proportional to the number of revolutions. When the motor drive IC begins to accelerate the motor, the PWM frequency is low and the motor drive current is large. This results in a large ripple in the supply current per PWM, which cannot satisfy customer specification and would be considered unacceptable.

In a case where a voltage profile for soft switching control is divided into a larger number of segments, a high frequency is maintainable, but the circuit scale becomes larger accordingly. This poses a problem of an enlarged size of the motor drive IC.

To keep the circuit enlargement as little as possible, even if the number of segments into which a voltage profile is divided is assumed to be $2^n$ (64, 128, 256 . . . ) among which switching is possible, the predriver and the zero cross detecting circuit become very difficult to design with a PWM frequency in the order of 200 kHz, for example. Furthermore, a decrease in power efficiency due to switching loss is not negligible.

An object of the present invention it to provide a technique that allows for a significant reduction in the noise and vibration of a brushless motor from startup up to the number of steady revolutions.

The above-noted object and other objects and novel features of the present invention will become apparent from the description of the present specification and the accompanying drawings.

Typical aspects of the invention disclosed in this application are summarized as follows.

One aspect of the present invention resides in a motor drive device that switches a current to flow in each of the phases of a brushless motor having a plurality of coils and drives the brushless motor, the motor derive device comprising a motor drive control mechanism that performs control processing, switching between a first mode of soft switching control with an asynchronous PWM carrier signal independent of the number of revolutions of the brushless motor and a second mode of soft switching control with a synchronous PWM carrier signal synchronized with the number of revolutions of the brushless motor.

In another aspect of the invention, the motor drive control mechanism performs soft switching control with an asynchronous PWM carrier signal independent of the number of revolutions of the brushless motor from a startup of the brushless motor up to an arbitrarily set number of revolutions and performs soft switching control with a synchronous PWM carrier signal synchronized with the number of revolutions of the brushless motor when the brushless motor runs at the arbitrarily set number of revolutions or higher.

In a further aspect of the invention, the arbitrarily set number of revolutions of the brushless motor comprises the number of steady revolutions of the brushless motor.

In another aspect of the invention, the motor drive control mechanism comprises a common arithmetic unit that executes an arithmetic operation for a PLL control loop for the brushless motor, an arithmetic operation for a current control loop, and an arithmetic operation for soft switching control to suppress a steep change in current; a turn-on timing counter that generates a conducting phase signal from a result of the arithmetic operation for a PLL control loop; an output controller that generates a PWM signal to control a current to be supplied to the brushless motor; and a control unit that detects the number of revolutions of the brushless motor. The control unit activates a synchronization/no synchronization control signal indicating whether to synchronize the PWM carrier signal frequency with the number of revolutions of the brushless motor or fix the frequency, when the number of revolutions of the brushless motor is less than the number of steady revolutions, and deactivates the synchronization/no synchronization control signal, when the number of revolutions of the brushless motor has reached the number of steady revolutions. The common arithmetic unit detects whether a division control signal which is a synchronous PWM carrier signal count value generated by the turn-on timing counter has changed when the synchronization/no synchronization control signal is active and executes soft switch arithmetic upon detecting a change of the division control signal.

Other aspects of the invention disclosed in this application are summarized below.

Yet another aspect of the present invention resides in a semiconductor integrated circuit device for driving a motor, wherein the semiconductor integrated circuit device switches a current to flow in each of the phases of a brushless motor having a plurality of coils and drives the brushless motor, the semiconductor integrated circuit device comprising a motor drive control mechanism that performs control processing, switching between a first mode of soft switching control with an asynchronous PWM carrier signal independent of the number of revolutions of the brushless motor and a second mode of soft switching control with a synchronous PWM carrier signal synchronized with the number of revolutions of the brushless motor.

In a further aspect of the invention, the motor drive control mechanism performs soft switching control with an asynchronous PWM carrier signal independent of the number of revolutions of the brushless motor from a startup of the brushless motor up to an arbitrarily set number of revolutions and performs soft switching control with a synchronous PWM carrier signal synchronized with the number of revolutions of the brushless motor when the brushless motor runs at the arbitrarily set number of revolutions or higher.

In a still further aspect of the invention, the arbitrarily set number of revolutions of the brushless motor comprises the number of steady revolutions of the brushless motor.

In another aspect of the invention, the motor drive control mechanism comprises a common arithmetic unit that executes an arithmetic operation for a PLL control loop for the brushless motor, an arithmetic operation for a current control loop, and an arithmetic operation for soft switching control to suppress a steep change in current; a turn-on timing counter that generates a conducting phase signal from a result of the arithmetic operation for a PLL control loop; an output controller that generates a PWM signal to control a current to be supplied to the brushless motor; and a control unit that detects the number of revolutions of the brushless motor. The control unit activates a synchronization/no synchronization control signal indicating whether to synchronize the PWM carrier signal frequency with the number of revolutions of the brushless motor or fix the frequency, when the number of revolutions of the brushless motor is less than the number of steady revolutions, and deactivates the synchronization/no synchronization control signal, when the number of revolutions of the brushless motor has reached the number of steady revolutions. The common arithmetic unit detects whether a division control signal which is a synchronous PWM carrier signal count value generated by the turn-on timing counter has changed when the synchronization/no synchronization control signal is active and executes soft switch arithmetic upon detecting a change of the division control signal.

An effect obtained by typical aspects of the invention disclosed in the present application is outlined below.

It is possible to drive a brushless motor with low noise and low vibration from startup up to the number of steady revolutions.

DETAILED DESCRIPTION OF THE PREFERRED EMBODIMENTS

Embodiments of the present invention will now be described in detail based on the drawings. In all drawings for illustrating the embodiments, for the same components, in principle, the same reference numbers are assigned and their repeated description is omitted.

Figure 1:
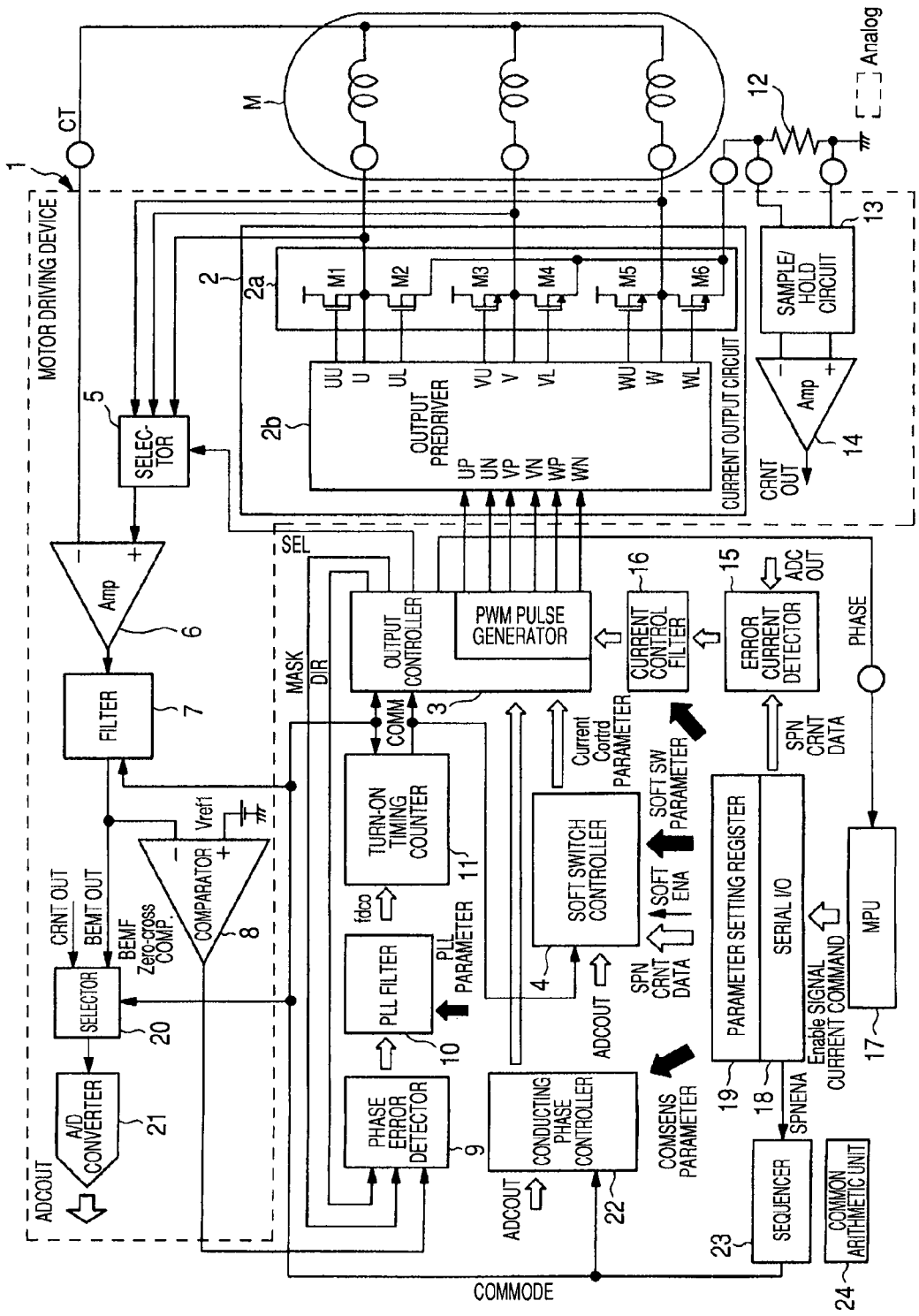
FIG. 1 is a block diagram of a motor driving device according to one embodiment of the invention.
Figure 2:
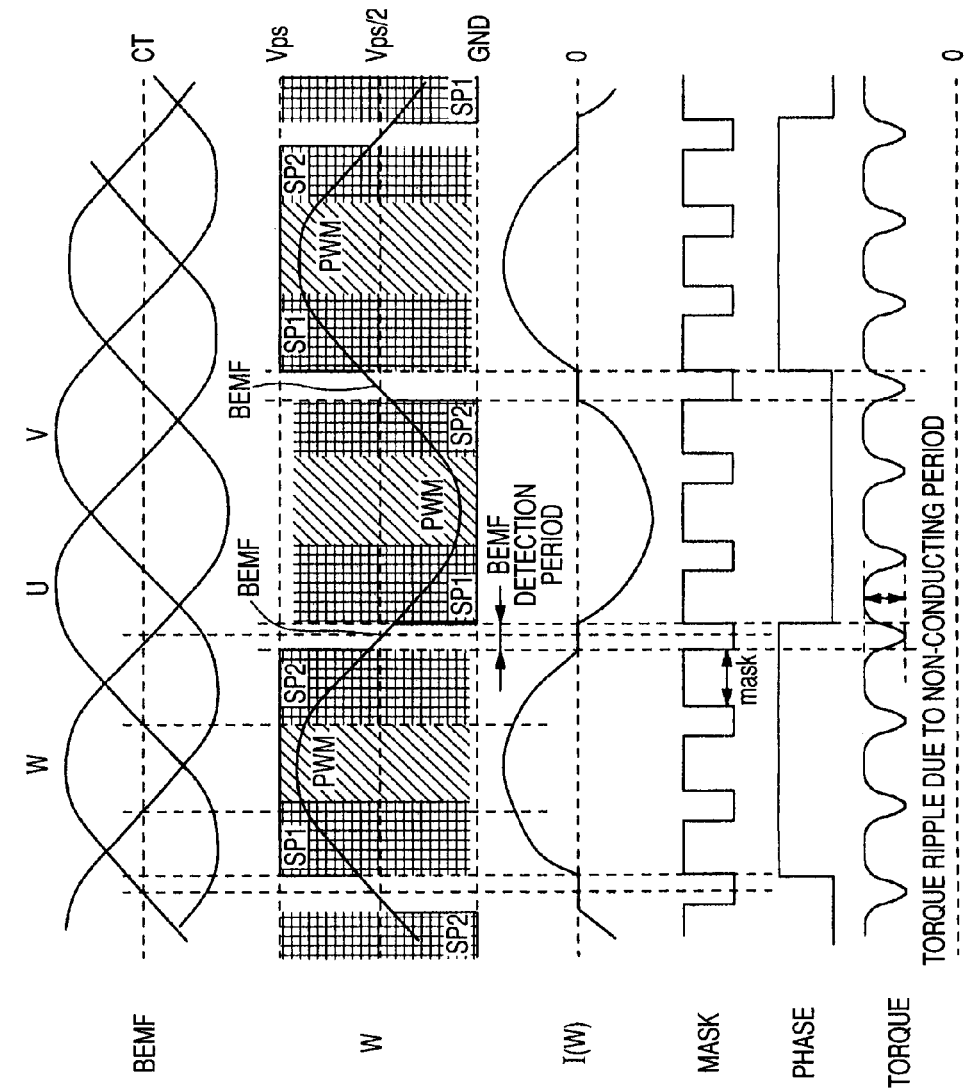
FIG. 2 illustrates an exemplary drive waveform of a pseudo sine wave for explaining an example of soft switching drive control by a soft switch controller.
Figure 3:
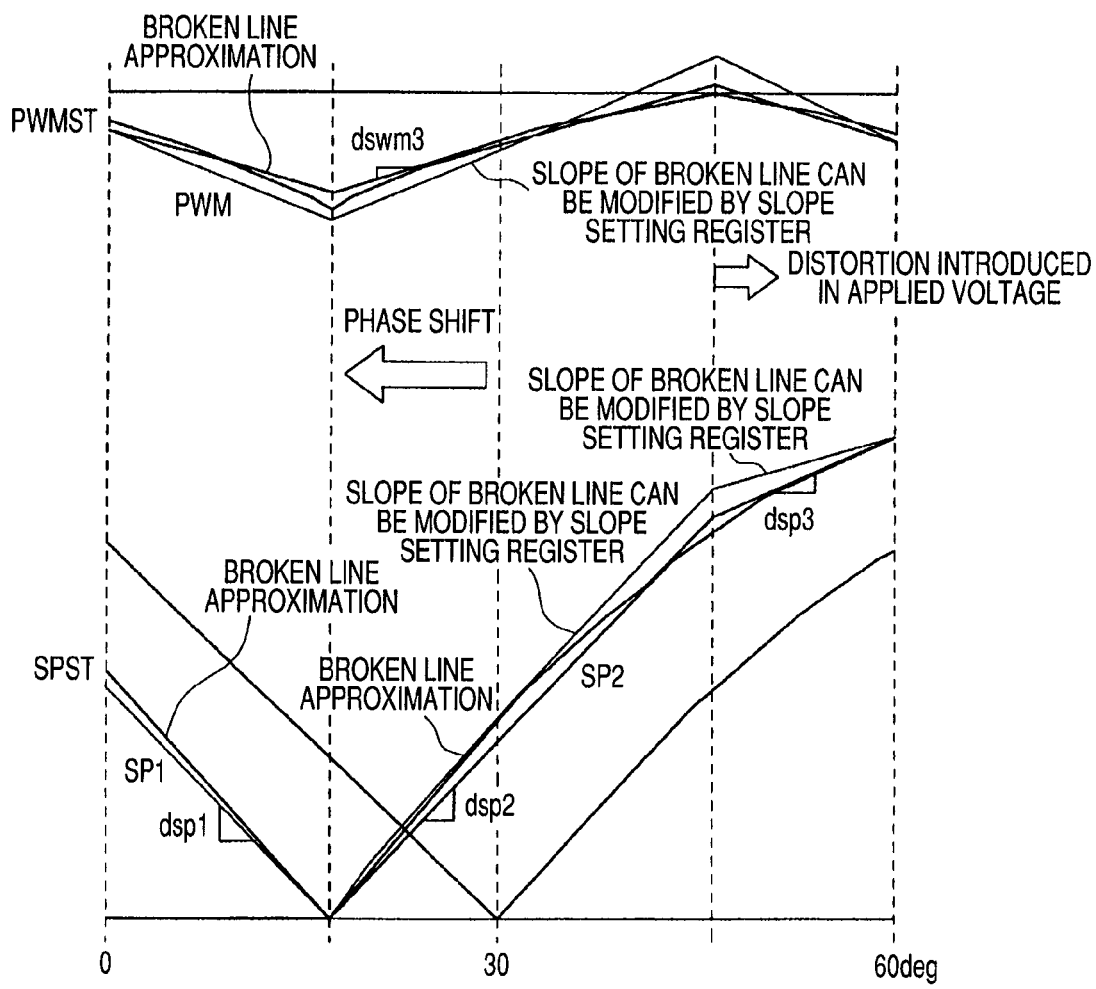
FIG. 3 is a graph for explaining an example of calculating a voltage profile according to one embodiment of the invention.
Figure 4:
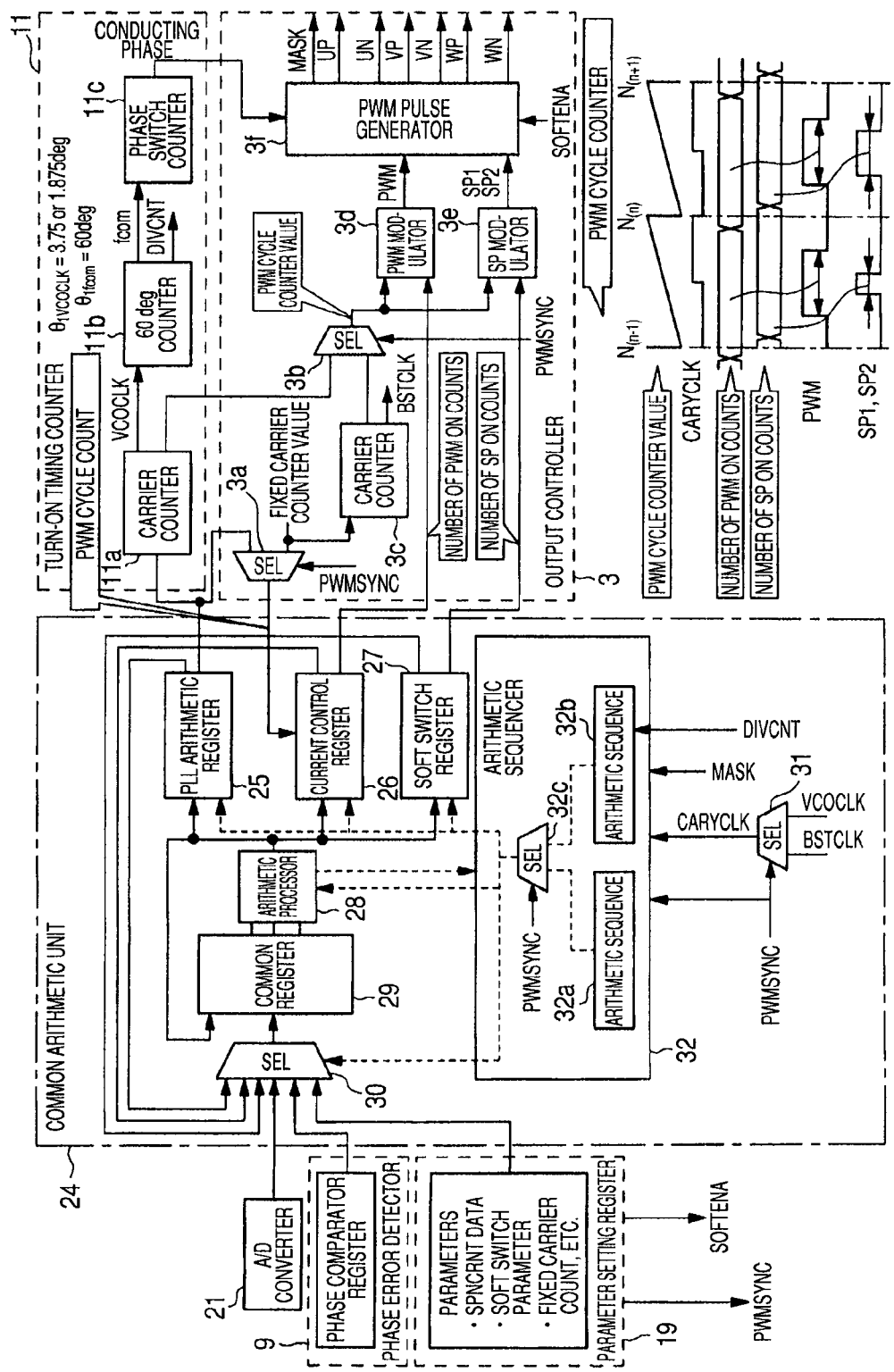
FIG. 4 is a block diagram showing a configuration of a common arithmetic unit and its peripheral blocks connected thereto, provided in the motor driving device shown in FIG. 1.
Figure 5:
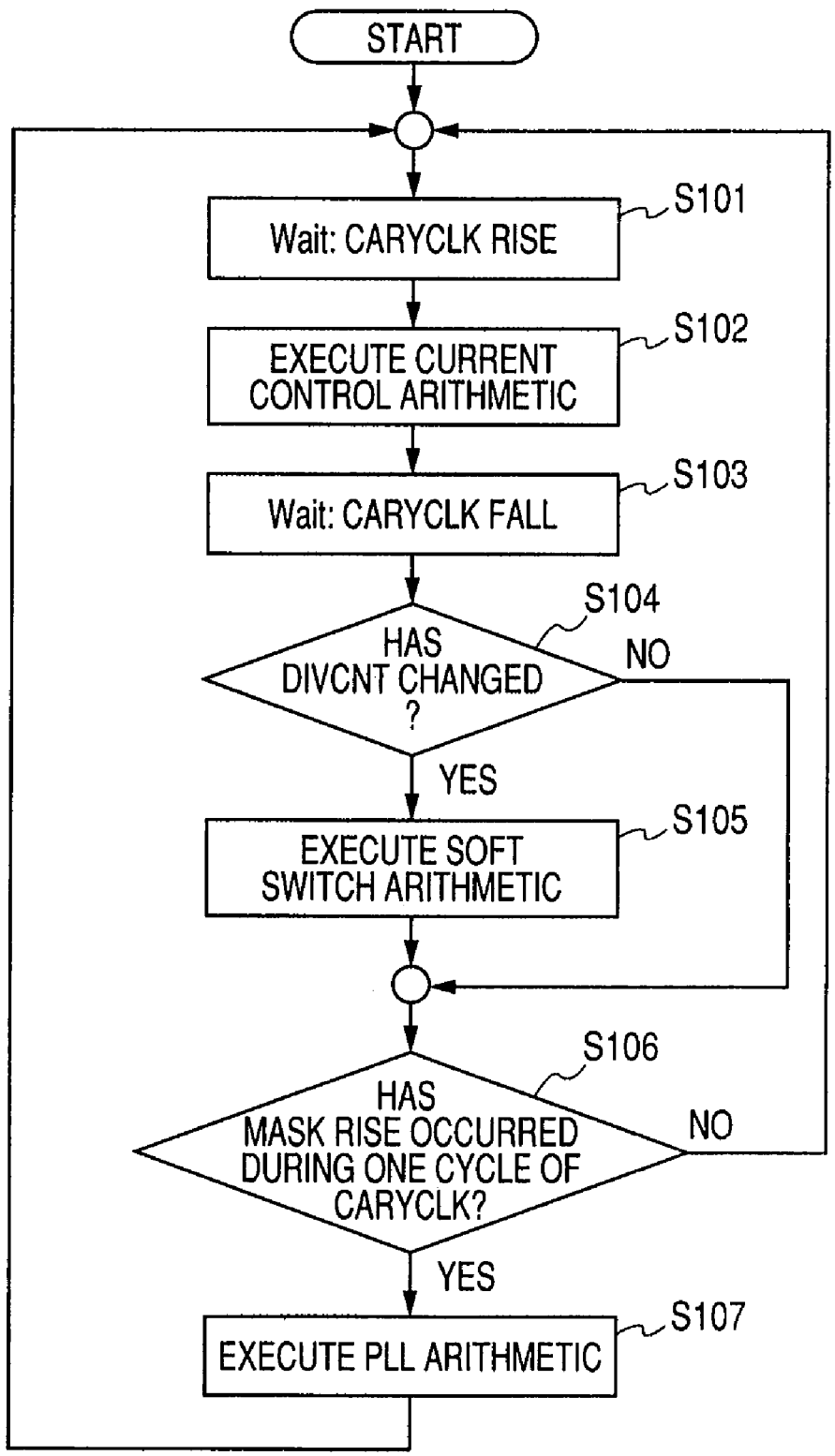
FIG. 5 is a flowchart illustrating an exemplary operation of the common arithmetic unit shown in FIG. 4.
Figure 6:
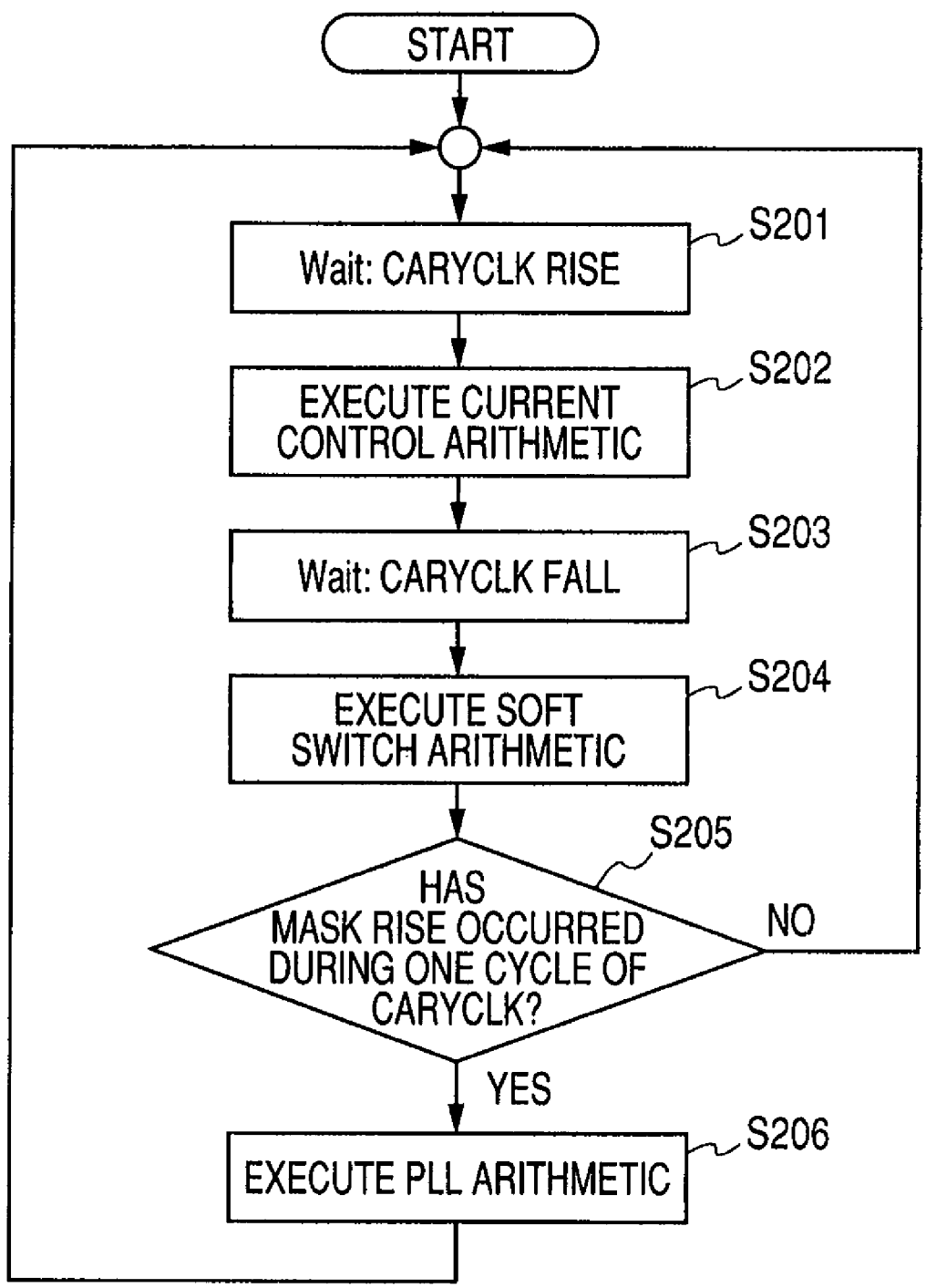
FIG. 6 is a flowchart following the one shown in FIG. 5.
Figure 7:
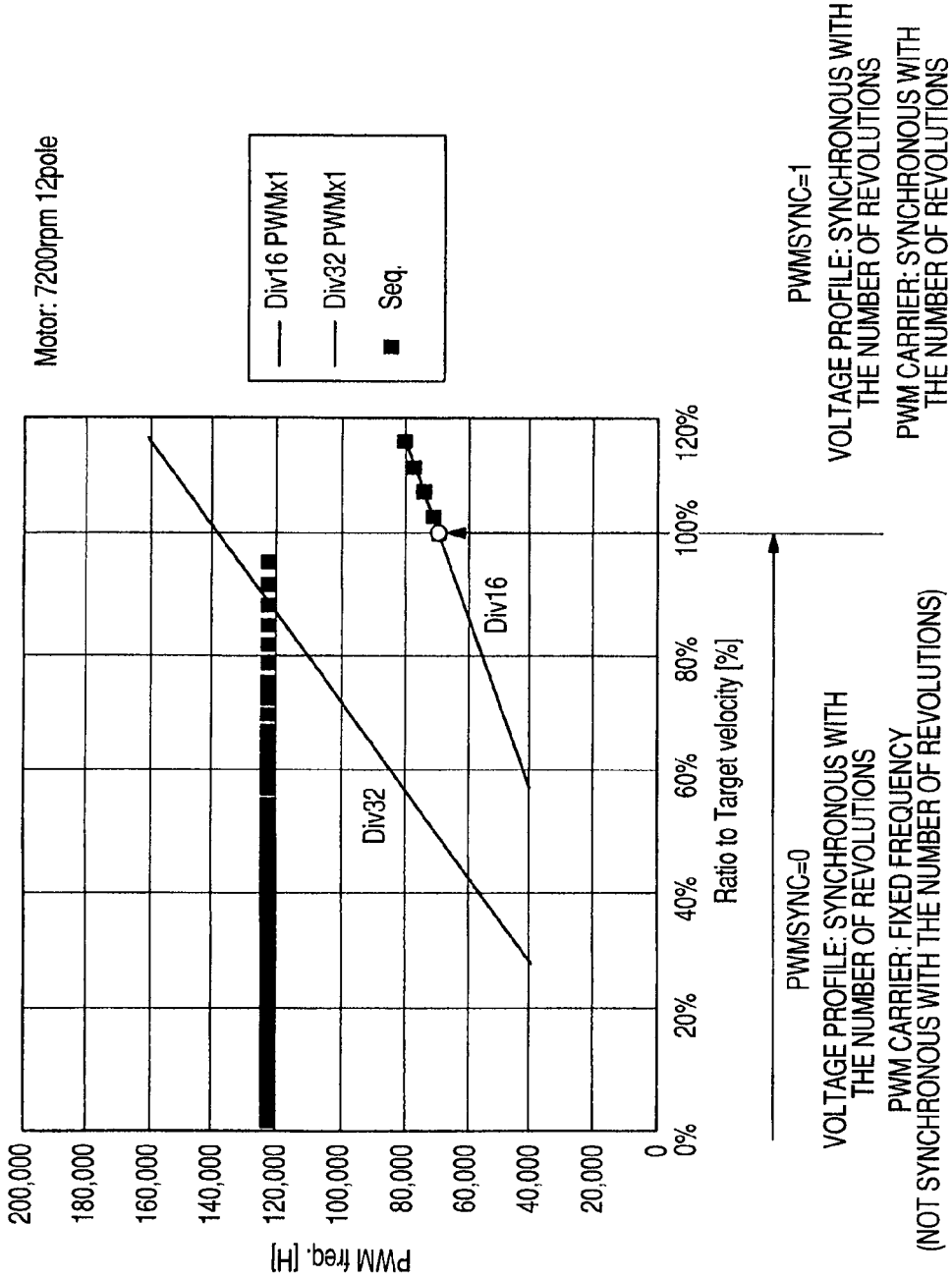
FIG. 7 is graph for explaining a relationship between the number of revolutions of a three-phase brushless motor and PWM frequency, according to one embodiment of the invention.
Figure 8:
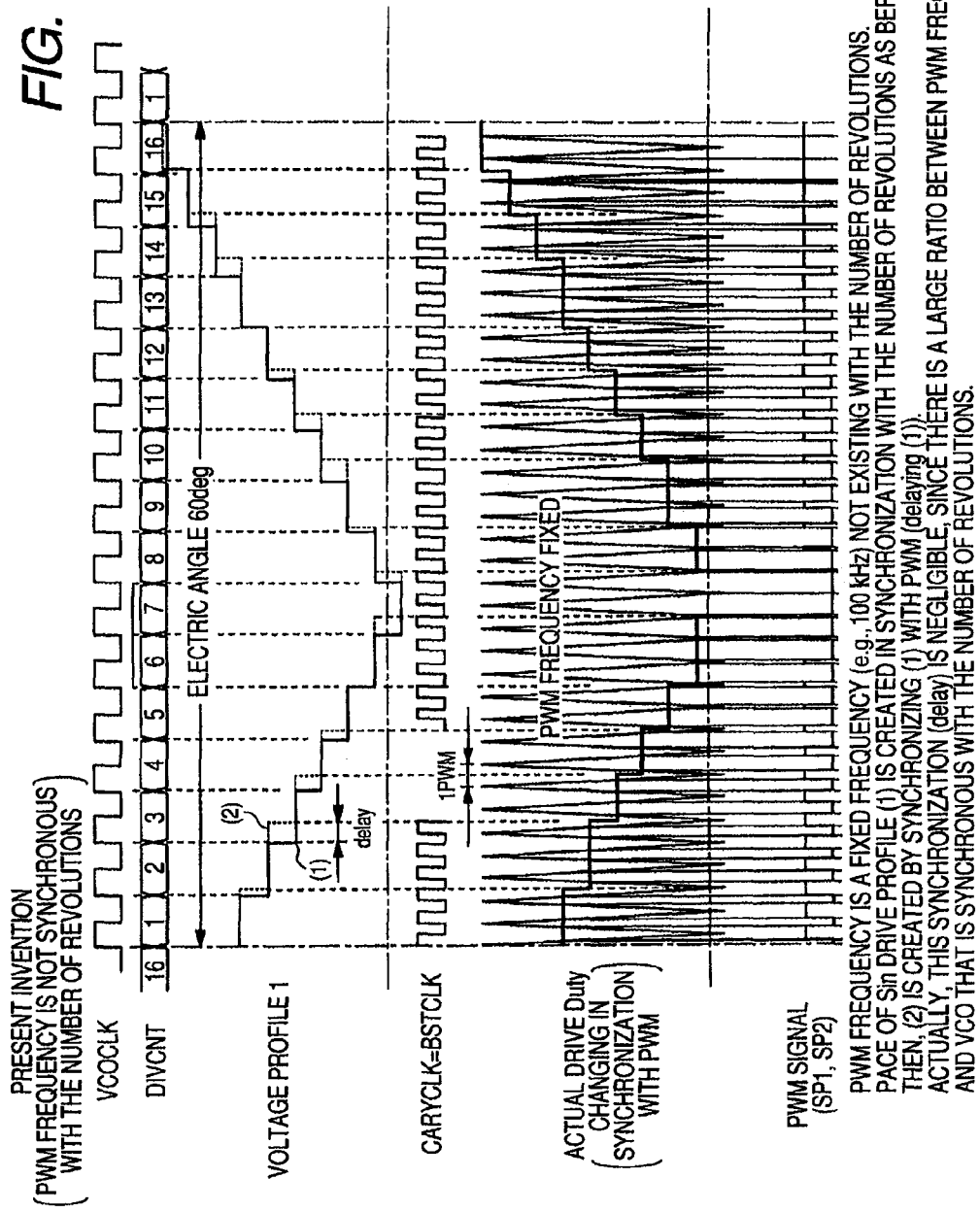
FIG. 8 is a diagram for explaining an exemplary voltage profile created by the common arithmetic unit shown in FIG. 4.

FIG. 1 is a block diagram of a motor driving device according to one embodiment of the present invention. FIG. 2 illustrates an exemplary drive waveform of a pseudo sine wave for explaining an example of soft switching drive control by a soft switch controller. FIG. 3 is a graph for explaining an example of calculating a voltage profile. FIG. 4 is a block diagram showing a configuration of a common arithmetic unit and its peripheral blocks connected thereto, provided in the motor driving device shown in FIG. 1. FIG. 5 is a flowchart illustrating an exemplary operation of the common arithmetic unit shown in FIG. 4. FIG. 6 is a flowchart following the one shown in FIG. 5. FIG. 7 is a graph for explaining a relationship between the number of revolutions of a three-phase brushless motor and PWM frequency. FIG. 8 is a diagram for explaining an exemplary voltage profile created by the common arithmetic unit shown in FIG. 4.

In the present embodiment, the motor driving device 1 controls driving of a three-phase brushless motor M such as a spindle motor which is used in, e.g., a hard disk drive. The motor driving device 1, as shown in FIG. 1, is comprised of a current output circuit 2, an output controller 3, a soft switch controller 4, a selector 5, a preamplifier 6, a filter 7, a comparator 8, a phase error detector 9, a PLL filter 10, a turn-on timing counter 11, a DC shunt resistor 12, a sample and hold circuit 13, a differential amplifier for output current detection 15, a current control filter 16, an MPU 17, a serial port 18, a parameter setting register 19, a selector 20, an A/D converter 21, a conducting phase controller 22, a sequencer 23, and a common arithmetic unit 24.

The current output circuit 2 is comprised of an output section 2a and an output predriver 2b and causes a current to flow in coils Lu, Lv, Lw of the three-phase brushless motor M in order. The output section 2a is comprised of transistors M1 to M6 which comprise power MOSFETs (Field Effect Transistors) or the like.

The three-phase brushless motor M is driven by a pulse width modulated (PWM) signal output by the output section 2a and the output predriver 2b. The output controller 3 which forms a part of a motor drive control mechanism generates and supplies a PWM signal that drives the transistors M1 to M6 in the current output circuit 2 and controls an output current. The output controller 3 also outputs to the selector 5 a control signal to select a coil terminal at which the back electromotive force should be detected.

The output predriver 2b operates with inputs of PWM modulated signals UP, UN, VP, VN, WP, WN which are results of PWM modulation, in the output controller 3, of a sine-wave drive voltage generated by the soft switch controller 4. The soft switch controller 4 controls conducting phase switching so that two conducting phases are PWM modulated, thereby smoothing current switching.

FIG. 2 illustrates an exemplary drive waveform of a pseudo sine (sin) wave for explaining an example of soft switching drive control by the soft switch controller 4.

As shown, the drive waveform is placed in a non-conducting state only when a zero cross of the BEMF back electromotive force is detected. After the zero cross detection period, a voltage profile SP1 by soft switch control, followed by PWM by current control, a voltage profile SP2 by soft switch control, and a non-conducting period for zero cross detection are repeated.

Here, a mask signal MASK is used to control a period of BEMF back electromotive force zero cross detection. A Lo MASK signal corresponds to a BEMF detection period.

For the above voltage profiles SP1, SP2, initial values (PWMST, SPST) of drive voltage patterns are calculated from a drive current and an amount of phase shift determined by a phase setting register, as shown in FIG. 3.

Referring to FIG. 1, next, one of U, V, W phases of an output voltage to the spindle motor, which are output from the output predriver 2b, is selected by the selector 5 as the phase for which the BEMF back electromotive force should be detected. A differential voltage of the selected phase with respect to a neutral point CT of the motor coils is generated by the preamplifier 6.

An output signal of the preamplifier 6, after filtered by the filter 7, is compared to a reference voltage Vref1 by the comparator 8. By this comparator 8, the BEMF (back electromotive force) zero cross is detected.

The result of the zero cross detection is input to the phase error detector 9. An output signal of the phase error detector 9 passes through a PLL control loop which is comprised of the PLL filter 10, the turn-on timing counter 11, the output controller 3, the current output circuit 2, and the three-phase brushless motor M. The PLL control loop provides motor driving with a low revolution jitter.

Detecting a motor drive current for the three-phase brushless motor M is done by using the DC shunt resistor 12. A voltage detected by the DC shunt resistor 12 passes through the sample and hold circuit 13 and is amplified by the differential amplifier for output current detection and A/D converted.

For the detected value CRNOUT, after A/D conversion, an error is calculated by the error current detector 15, based on a current command SPN CRNT DATA. The drive current is controlled through a current control loop comprised of the current control filter 16, the output controller 3, the current output circuit 2, and the three-phase brushless motor M.

For motor speed control, a period signal PHASE that is proportional to the number of revolutions is output by the output controller 3 to the MPU 17 which is a microprocessor. The MPU 17 which forms a part of the motor drive control mechanism and serves as a control unit compares the motor speed to a target speed, based on the period signal PHASE, and issues a current command depending on the speed.

Arithmetic processing for these PLL control, current control, and soft switch control is performed by the common arithmetic unit 24 in which an arithmetic processor is shared.

The serial port 18 interfaces with the MPU 17. Parameters such as current command data SPN CRNT DATA, current control, PLL, and constant torque driving are set by the parameter setting register 19.

A signal from which noise has been eliminated by the filter 7 is supplied via the selector 20 to the A/D converter 21 and converted into a digital signal. The device includes the conducting phase controller 22 that controls a startup of the three-phase brushless motor M from the stopped state and the sequencer 23 controls internal operation, as a spindle drive related system.

FIG. 4 is a block diagram showing a configuration of the common arithmetic unit 24 and its peripheral blocks connected thereto.

The common arithmetic unit 24 which forms a part of the motor drive control mechanism is comprised of a PLL arithmetic register 25, a current control register 26, a soft switch register 27, an arithmetic processor 28, a common register 29, selectors 30, 31, and an arithmetic sequencer 32.

To the input terminals of a selector 30, the PLL arithmetic register 25, the current control register 26, and the soft switch register 27 are connected, so that arithmetic results stored in these registers are input to the selector 30. To the input terminals of the selector 30, further, the A/D converter 21, a phase comparator register provided in the phase error detector 9, and the parameter setting register 19 are connected, so that converted data from the A/D converter, a register value from the phase comparator register, and parameter values set in the parameter setting register 19 are input to the selector 30.

To a control terminal of the selector 30, a selector 32c of the arithmetic sequencer 32, which will be described later, is connected, so that a control signal (clock signal BSTCLK or clock signal VCOCLK) output from the selector 32c is input to the selector 30. Based on the control signal, the selector 30 selects an arbitrary input terminal and outputs the value received at the input terminal from an output terminal of the selector 30.

To the output terminal of the selector 30, the common register 29 is connected. To the common register 29, the arithmetic processor 28 is connected. An output terminal of the arithmetic processor 28 is connected to the common register 29, the PLL arithmetic register 25, the current control register 26, and the soft switch register 27, so that an arithmetic result of the arithmetic processor 28 is output to the appropriate one of these registers.

The arithmetic sequencer 32 is comprised of arithmetic sequences 32a, 32b, and a selector 32c.

The selector 32c selects either of arithmetic results of the arithmetic sequence 32a and the arithmetic sequence 32b, based on a control signal PWMSYNC which is input externally via the serial port 18, and outputs the arithmetic result to the selector 30, the arithmetic processor 28, the PLL arithmetic register 25, the current control register 26, and the soft switch register 27.

A control signal PWMSYNC which is a synchronization/no synchronization control signal indicates whether to synchronize the PWM signal frequency with the number of revolutions of the motor M or fix the frequency.

Arithmetic results of PLL control, current control, and soft switch control are controlled by this arithmetic sequencer 32 and stored into the PLL arithmetic register 25, the current control register 26, and the soft switch register 27, respectively.

The turn-on timing counter 11 which forms a part of the motor drive control mechanism is comprised of a carrier counter 11a, a 60 deg counter 11b, and a phase switch counter 11c. The turn-on timing counter 11 generates a conducting phase signal from the PLL arithmetic result stored in the PLL arithmetic register 25, using the carrier counter 11a, the 60 deg counter 11b, and the phase switch counter 11c.

The carrier counter 11a generates a clock signal VCOCLK serving as a synchronous PWM carrier signal from the PLL arithmetic result stored in the PLL arithmetic register 25 (the cycle count value of the clock signal VCOCLK).

The 60 deg counter 11b is a divide-by-16 or divide-by-32 counter. The 60 deg counter 11b generates a divisional signal fcom with a cycle of 60 deg from the clock signal VCOCLK and outputs this signal fcom as well as a division control signal DIVCNT which is a count value of the divisional signal fcom to the phase switch counter 11c.

The output controller 3 is comprised of selectors 3a, 3b, a carrier counter 3c, a PWM modulator 3d, an SP modulator 3e, and a PWM pulse generator 3f. The arithmetic sequencer 32 is comprised of arithmetic sequences 32a, 32b, and a selector 32c.

To a control terminal of a selector 3a, a control signal PWMSYNC is input. To the input terminals of the selector 3a, a count value (clock signal VCOCLK of the carrier counter 11a and a fixed carrier count value are input, respectively. To the output terminal of the selector 3a, the current control register 26 is connected.

To the input terminals of a selector 3b, the carrier counter 3c and the carrier counter 11a are connected, so that count values of these counters are input to the selector 3b, respectively. To the output terminal of the selector 3b, the PWM modulator 3d and the SP modulator 3e are connected.

To the input terminals of the PWM pulse generator 3f, the PWM modulator 3d and the SP modulator 3e are connected, so that a PWM signal modulated by the PWM modulator 3d and voltage profiles SP1, SP2 modulated by the SP modulator 3e are input to the PWM pulse generator 3f, respectively.

To the PWM pulse generator 3f, a soft switch enable signal SOFTENA is input. The PWM pulse generator 3f performs soft switching control using the output of the SP modulator 3e, when the soft switch enable signal SOFTENA becomes active (e.g., Hi level).

To the input terminals of the selector 31, a clock signal BSTCLK generated by the carrier counter 3c and a clock signal VCOCLK generated by the carrier counter 11a are input, respectively.

To a control terminal of the selector 31, a control signal PWMSYNC which is input externally is input. Based on the control signal PWMSYNC, the selector 31 feeds either the clock signal BSTCLK or the clock signal VCOCLK to the arithmetic sequencer 32 as a PWM carrier signal CARYCLK. The arithmetic sequencer 32 executes an iterative calculation based on the PWM carrier signal CARYCLK input thereto.

In the output controller 3, based on the control signal PWMSYNC, the selector 3b selects and outputs either the count value of the carrier counter 11a or the count value of the carrier counter 3c to the PWM modulator 3d and the SP modulator 3e.

The PWM modulator 3d compares the count value of the carrier counter 3c and the arithmetic result obtained (the number of ON counts of PWM signal (the number of PWM ON counts) stored in the current control register 26), executes PWM modulation, and creates a PWM signal.

The SP modulator 3e compares the count value of the carrier counter 3c and the arithmetic result obtained (the number of ON counts of voltage profile (the number of SP ON counts) stored in the soft switch register 27) and creates voltage profiles SP1, SP2.

The PWM pulse generator 3f generates a predriver drive signal from the conducting phase signal output from the phase switch counter 11c, the PWM signal output from the PWM modulator 3d, and the voltage profiles SP1, SP2 output from the SP modulator 3e.

Next, the operation of the common arithmetic unit 24 according to the present embodiment is explained by using the flowcharts of FIG. 5 and FIG. 6 and the graph for explaining a relationship between the number of revolutions of the three-phase brushless motor M and PWM frequency, shown in FIG. 7.

In this case, the three-phase brushless motor M is driven according to the steps in the flowchart shown in FIG. 5 from its stopped state (0%) up to steady run state (100%), wherein a large current is required for startup and a control signal PWMSYNC which is Lo level (active) is input, as shown in FIG. 7.

In response to the Lo level control signal PWMSYNC, the selector 3a selects a fixed carrier count value, the selector 3b selects an output signal of the carrier counter 3c, and the selector 31 selects a clock signal BSTCLK. In FIG. 7, a fixed frequency of about 120 kHz is assumed.

Subsequently, when the three-phase brushless motor M has entered the steady running state requiring a smaller current, the control signal PWMSYNC is turned high (Hi level). According to the steps of the flowchart shown in FIG. 6, the operation switches to a synchronization mode in which the PWM carrier frequency is synchronized with the number of revolutions of the motor, so that the motor runs with low noise and low revolution jitter (PWM frequency is 69 kHz).

Initially, in FIG. 5, when the arithmetic sequencer 32 detects a rise of a clock signal CARYCLK (step S101), current control arithmetic is executed. In this case, the arithmetic sequencer 32 controls the selector 30 to load data output from the A/D converter 21 and data (current command data SPN-CRNT and a fixed carrier count value) set in the parameter setting register 19 into the common register 29.

The arithmetic sequencer 32 also controls the operation mode of the arithmetic processor 28 to store its arithmetic result into the current control register 26 (step S102).

Then, when the arithmetic sequencer 32 detects a fall of the clock signal CARYCLK (step S103), the arithmetic sequence 32b determines whether a division control signal DIVCNT has changed (step S104).

If the division control signal DIVCNT has changed as determined in step S104, soft switch arithmetic is executed (step S105). When this soft switch arithmetic is executed, the arithmetic sequencer 32 controls the selector 30 to load data output from the A/D converter 21, data (current command data SPNCRNT, a soft switch parameter) set in the parameter setting register 19, and data from the current control register 26 into the common register 29. The arithmetic sequencer 32 also controls the operation mode of the arithmetic processor 28 to store its arithmetic result into the soft switch register 27.

If the division control signal DIVCNT has not changed as determined in step S104, a step S106 which will be described below is executed.

The arithmetic sequencer 32 determines whether a rise of a mask signal MASK has occurred during one cycle of the PWM carrier signal CARYCLK (step S106). If a rise of the mask signal MASK has not occurred, the operation returns to the step S101.

If, a rise of the mask signal MASK has occurred during one cycle of the PWM carrier signal CARYCLK, as determined in the step S106, PLL control arithmetic is executed (step S107), then the operation returns to the step S101.

In the execution of PLL control arithmetic, the arithmetic sequencer 32 controls the selector 30 to load data from the phase comparator register of the phase error detector 9 and data from the PLL arithmetic register 25 into the common register.

The arithmetic sequencer 32 also controls the operation mode of the arithmetic processor 28 to store its arithmetic result into the PLL arithmetic register 25.

When the MPU 17 judges that the three-phase brushless motor M has entered the steady running state (100%) from the period signal PHASE, the process of FIG. 6 is carried out in the synchronization mode in which the PWM carrier frequency is synchronized with the number of revolutions of the motor, so that the motor runs with low noise and low revolution jitter.

Since the steps S201 to S206 in FIG. 6 are the same as the steps S101 to S103 and S105 to S107 in FIG. 5, the explanation of these steps is omitted. In the process of FIG. 6, a clock signal VCOCLK is selected as the clock signal CARYCLK by the selector 31. During the control of driving the three-phase brushless motor M, these steps S201 to S206 are to be repeated.

FIG. 8 is a diagram for explaining an exemplary voltage profile which is created by applying the present invention.

A voltage profile is created by adding and subtracting an amount of voltage (dpwm, dps1, dps2, dps3) which changes for each cycle of the clock signal VCOCLK to/from a voltage pattern value for every clock signal VCOCLK (or clock signal BSTCLK) for broken line approximation.

The update interval of is shortest and the arithmetic sequence of current control arithmetic is calculated iteratively on the basis of a PWM carrier signal CARYCLK. As already described, current control arithmetic is calculated once for every PWM carrier signal CARYCLK. PLL arithmetic is executed when the mask signal changes from Lo level to Hi level, that is, only after the completion of BEMF detection.

Soft switch arithmetic is triggered by detecting a change of the division control signal DIVCNT and executed only once for one cycle of the division control signal DIVCNT, and the voltage profile is synchronized with the number of revolutions.

In the way described above, current control can be performed with a fixed PWM frequency and a certain update interval of current control is maintained, whereas soft switching control in which the voltage profile is synchronized with the number of revolutions can be performed.

According to the present embodiment, a ripple in the supply current can be reduced, since the PWM carrier frequency can be fixed when the motor is initially accelerated, wherein the acceleration requires a large current.

Soft switching control becomes possible from a low revolution and, therefore, it is possible to start up the three-phase brushless motor M with low noise.

Once the motor steady running is attained, soft switching control with a PWM carry frequency synchronized with the number of revolutions of the motor is performed. Accordingly, it is possible to drive the motor with low noise and low revolution jitter.

While the invention made by the present inventors has been described specifically based on its embodiment hereinbefore, it will be appreciated that the present invention is not limited to the described embodiment and various modifications may be made without departing from the gist of the invention.

Figure 9:
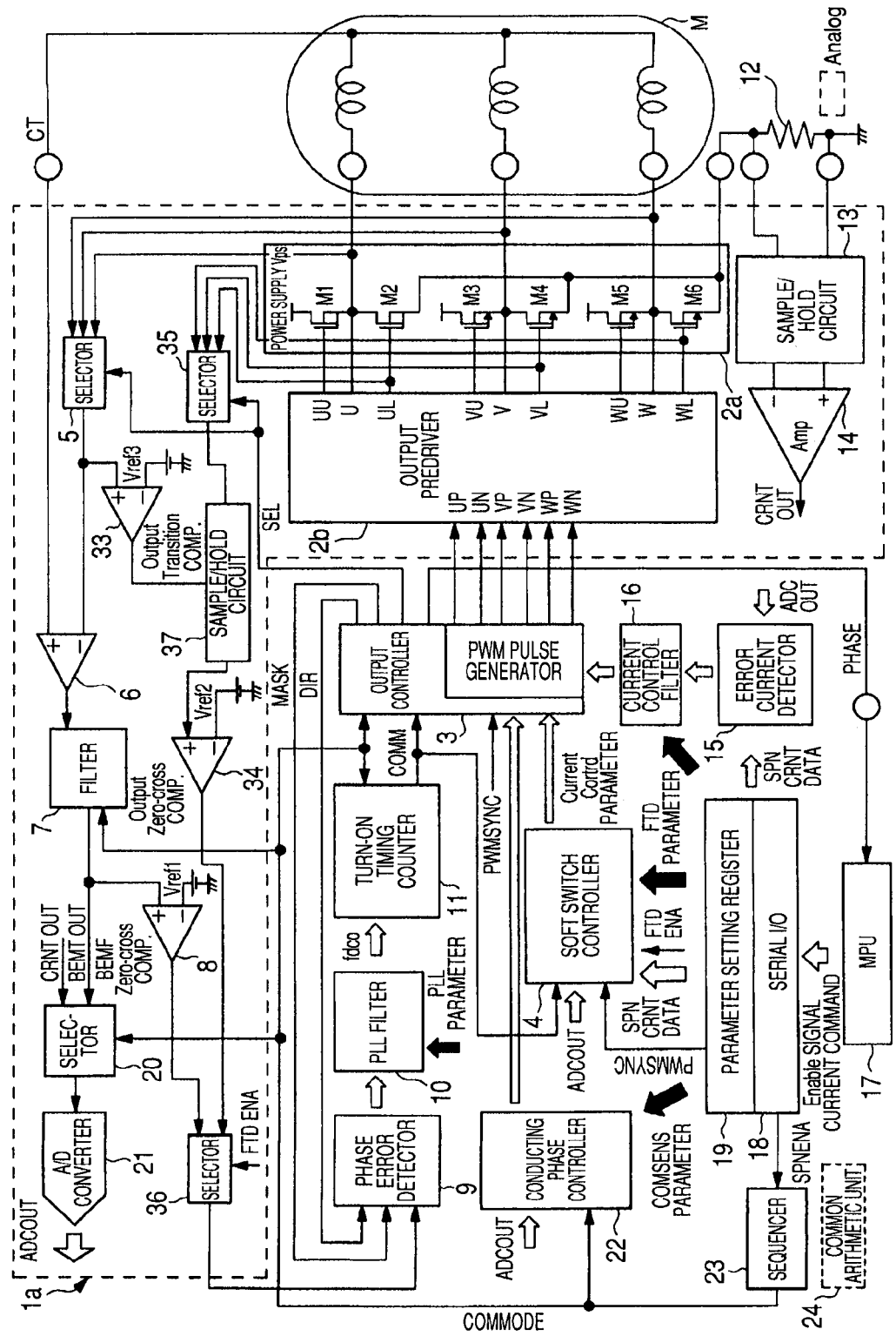
FIG. 9 is a block diagram of a motor driving device according to another embodiment of the invention.

Although the above-described embodiment relates to the motor driving device by 165 deg conduction, the present invention may be applied to, for example, a motor driving device 1a by 180 deg conduction, which is shown in FIG. 9.

In this case, the motor driving device 1a further includes comparators 33, 34, selectors 35, 36, and a sample/hold circuit 37 added to the configuration of the motor driving device 1 shown in FIG. 1.

In the motor driving device 1a, one of U, V, W phases of an output voltage to the spindle motor, is selected by the selector 5 as the phase for which the BEMF back electromotive force should be detected. A differential voltage of the selected phase with respect to a neutral point CT of the motor coils is generated by the preamplifier 6.

An output signal of the preamplifier 6, after being filtered by the filter 7, is compared to a reference voltage Vref1 by the comparator 8. By this comparator 8, the BEMF (back electromotive force) zero cross is detected.

One of gate voltages UL, VL, WL of lower transistors M2, M4, M6 in the half bridge output stage is selected by the selector 35 as the phase for which a current zero cross should be detected. The current zero cross is detected as follows: the comparator 33 detects the timing at which the output of the selector 5 intersects with a reference voltage Vref3, the output of the selector 35 is sampled and held by the sample/hold circuit 37, and this voltage is compared to a reference voltage Vref2 by the comparator 34.

Which information on BEMF zero cross output and current zero cross output should be used is selected by the selector 36. The detected current zero cross should be used if constant torque driving is performed; otherwise, the detected BEMF zero cross should be used.

Figure 10:
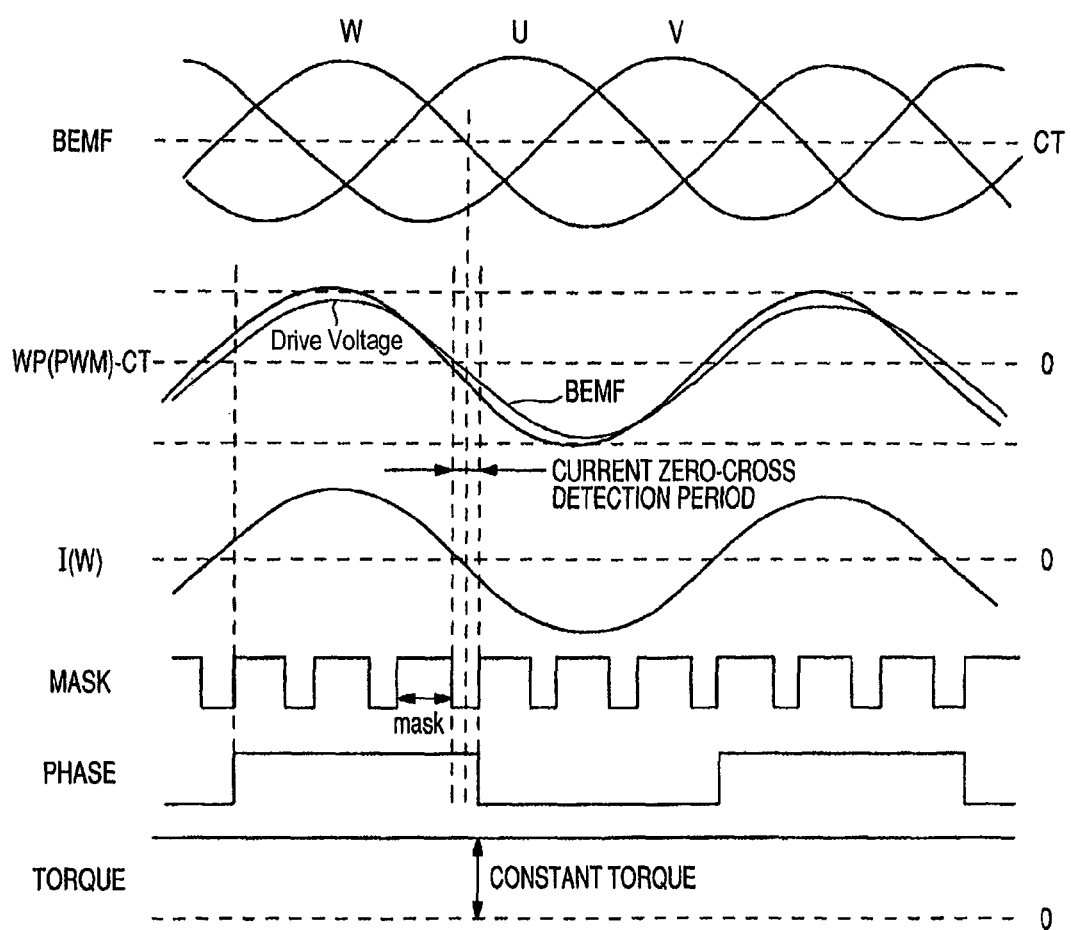
FIG. 10 illustrates an exemplary operating waveform of the motor driving device shown in FIG. 9.

FIG. 10 illustrates an exemplary operating waveform of the motor driving device 1a shown in FIG. 9.

In the case that conduction timing is controlled by detecting a current zero cross, a non-conducting period for BEMF detection is not needed and it is possible to drive the motor with a sine wave voltage as shown in FIG. 10.

A voltage that is applied to the motor coils is a voltage obtained by subtracting the BEMF from the drive voltage. If the BEMF is a sine wave, the voltage applied to the motor coils is also a sine wave. Hence, the drive current is a sine wave, making it possible to drive the motor at a constant toque. Consequently, a constant motor torque and the motor running with low noise and low vibration can be achieved.

In the motor driving device 1a, a difference only lies in the method of detecting a BEMF phase. A voltage profile is generated in the same way as in FIG. 10, enabling 180 deg conduction, and the present invention can be applied.

The present invention is suitable for a technique for a startup of a multi-phase brushless motor with low noise and low vibration.

What is claimed is:

1. A motor drive device that switches a current to flow in each of phases of a brushless motor having a plurality of coils and drives said brushless motor, the motor drive device comprising:
a motor drive control mechanism that performs control processing by switching between a first mode of soft switching control with an asynchronous PWM carrier signal independent of the number of revolutions of said brushless motor and a second mode of soft switching control with a synchronous PWM carrier signal synchronized with the number of revolutions of said brushless motor, wherein said motor drive control mechanism comprises:
a common arithmetic unit that executes an arithmetic operation for a PLL control loop for said brushless motor, an arithmetic operation for a current control loop, and an arithmetic operation for soft switching control to suppress a steep change in current;
a turn-on timing counter that generates a conducting phase signal from a result of the arithmetic operation for a PLL control loop;
an output controller that generates a PWM signal to control a current to be supplied to said brushless motor; and
a control unit that detects the number of revolutions of said brushless motor, wherein said control unit activates, when the number of revolutions of said brushless motor is less than the number of steady revolutions, a synchronization/no synchronization control signal indicating whether to synchronize the PWM carrier signal frequency with the number of revolutions of said brushless motor or fix the frequency, and deactivates said synchronization/no synchronization control signal when the number of revolutions of said brushless motor has reached the number of steady revolutions, and wherein said common arithmetic unit detects whether a division control signal which is a synchronous PWM carrier signal count value generated by said turn-on timing counter has changed when said synchronization/no synchronization control signal is active, and executes soft switch arithmetic upon detecting a change of said division control signal.

2. The motor drive device according to claim 1,
wherein said motor drive control mechanism performs soft switching control with an asynchronous PWM carrier signal independent of the number of revolutions of said brushless motor from a startup of said brushless motor up to an arbitrarily set number of revolutions, and performs soft switching control with a synchronous PWM carrier signal synchronized with the number of revolutions of said brushless motor when said brushless motor runs at the arbitrarily set number of revolutions or higher.

3. The motor drive device according to claim 2,
wherein the arbitrarily set number of revolutions of said brushless motor is the number of steady revolutions of said brushless motor.

4. A semiconductor integrated circuit device for driving a motor, wherein the semiconductor integrated circuit device switches a current to flow in each of phases of a brushless motor having a plurality of coils and drives said brushless motor, the semiconductor integrated circuit device comprising:
a motor drive control mechanism that performs control processing by switching between a first mode of soft switching control with an asynchronous PWM carrier signal independent of the number of revolutions of said brushless motor and a second mode of soft switching control with a synchronous PWM carrier signal synchronized with the number of revolutions of said brushless motor, wherein said motor drive control mechanism comprises:
a common arithmetic unit that executes an arithmetic operation for a PLL control loop for said brushless motor, an arithmetic operation for a current control loop, and an arithmetic operation for soft switching control to suppress a steep change in current;
a turn-on timing counter that generates a conducting phase signal from a result of the arithmetic operation for a PLL control loop;
an output controller that generates a PWM signal to control a current to be supplied to said brushless motor; and
a control unit that detects the number of revolutions of said brushless motor, wherein said control unit activates, when the number of revolutions of said brushless motor is less than the number of steady revolutions, a synchronization/no synchronization control signal indicating whether to synchronize the PWM carrier signal frequency with the number of revolutions of said brushless motor or fix the frequency, and deactivates said synchronization/no synchronization control signal when the number of revolutions of said brushless motor has reached the number of steady revolutions, and wherein said common arithmetic unit detects whether a division control signal which is a synchronous PWM carrier signal count value generated by said turn-on timing counter has changed when said synchronization/no synchronization control signal is active, and executes soft switch arithmetic upon detecting a change of said division control signal.

5. The semiconductor integrated circuit device according to claim 1, wherein said motor drive control mechanism performs soft switching control with an asynchronous PWM carrier signal independent of the number of revolutions of said brushless motor from a startup of said brushless motor up to an arbitrarily set number of revolutions and performs soft switching control with a synchronous PWM carrier signal synchronized with the number of revolutions of said brushless motor when said brushless motor runs at the arbitrarily set number of revolutions or higher.

6. The semiconductor integrated circuit device according to claim 5,
wherein the arbitrarily set number of revolutions of said brushless motor is the number of steady revolutions of said brushless motor.

7. A motor drive device that switches a current to flow in each of phases of a brushless motor having a plurality of coils and drives said brushless motor, the motor drive device comprising:
a motor drive control mechanism that performs control processing by switching between a first mode of soft switching control with an asynchronous PWM carrier signal independent of the number of revolutions of said brushless motor and a second mode of soft switching control with a synchronous PWM carrier signal synchronized with the number of revolutions of said brushless motor, wherein said motor drive control mechanism comprises:
a common arithmetic unit that executes an arithmetic operation for a PLL control loop for said brushless motor, an arithmetic operation for a current control loop, and an arithmetic operation for soft switching control to suppress a steep change in current;

a turn-on timing counter that generates a conducting phase signal from a result of the arithmetic operation for a PLL control loop; and an output controller that generates a PWM signal to control a current to be supplied to said brushless motor, wherein, in said first mode, said common arithmetic unit detects whether a division control signal which is a synchronous PWM carrier signal count value generated by said turn-on timing counter has changed, and executes soft switch arithmetic upon detecting a change of said division control signal.

8. The motor drive device according to claim 7, wherein said motor drive control mechanism performs soft switching control with an asynchronous PWM carrier signal independent of the number of revolutions of said brushless motor from a startup of said brushless motor up to an arbitrarily set number of revolutions, and performs soft switching control with a synchronous PWM carrier signal synchronized with the number of revolutions of said brushless motor when said brushless motor runs at the arbitrarily set number of revolutions or higher.

9. The motor drive device according to claim 8, wherein the arbitrarily set number of revolutions of said brushless motor is the number of steady revolutions of said brushless motor.

10. The motor drive device according to claim 7, further comprising:

a control unit that detects the number of revolutions of said brushless motor, wherein said control unit activates a synchronization/no synchronization control signal indicating whether to synchronize the PWM carrier signal frequency with the number of revolutions of said brushless motor or fix the frequency when the number of revolutions of said brushless motor is less than the number of steady revolutions, so that said motor drive control mechanism performs control processing in said first mode, and wherein said control unit deactivates said synchronization/no synchronization control signal when the number of revolutions of said brushless motor has reached the number of steady revolutions, so that said motor drive control mechanism performs control processing in said second mode.

* * * * *